(12) United States Patent
Eisenacher et al.

(10) Patent No.: US 8,576,239 B2
(45) Date of Patent: Nov. 5, 2013

(54) PARALLEL COHERENT RANDOM WALK SEARCH FOR IMAGE PROCESSING

(75) Inventors: Christian Eisenacher, Burbank, CA (US); Pau Panareda Busto, Aachen (DE)

(73) Assignee: Disney Enterprises, Inc., Burbank, CA (US)

( * ) Notice: Subject to any disclaimer, the term of this patent is extended or adjusted under 35 U.S.C. 154(b) by 181 days.

(21) Appl. No.: 13/281,838

(22) Filed: Oct. 26, 2011

(65) Prior Publication Data

US 2013/0106890 A1 May 2, 2013

(51) Int. Cl.
G09G 5/00 (2006.01)

(52) U.S. Cl.
USPC .......................................... 345/586; 345/582

(58) Field of Classification Search
None
See application file for complete search history.

(56) References Cited

U.S. PATENT DOCUMENTS

| | | | |
|---|---|---|---|
| 8,355,592 B1 * | 1/2013 | Shechtman et al. | 382/254 |
| 8,457,405 B2 * | 6/2013 | Mech et al. | 382/181 |
| 2007/0002071 A1 * | 1/2007 | Hoppe et al. | 345/582 |
| 2013/0016112 A1 * | 1/2013 | Burley et al. | 345/582 |
| 2013/0051685 A1 * | 2/2013 | Shechtman et al. | 382/218 |
| 2013/0093768 A1 * | 4/2013 | Lockerman et al. | 345/428 |

OTHER PUBLICATIONS

Barnes, Connelly, et al. "The generalized patchmatch correspondence algorithm." Computer Vision—ECCV 2010. Springer Berlin Heidelberg, 2010. 29-43.*

Barnes, Connelly, et al. "PatchMatch: a randomized correspondence algorithm for structural image editing." ACM Transactions on Graphics—TOG 28.3 (2009): 24.*

Arya, et al: "An Optimal Algorithm for Approximate Nearest Neighbor Searching in Fixed Dimensions" Proceedings of the Fifth Annual ACM-SIAM Symposium on Discrete Algorithms, 1994. 33 Pages.

Ashikhmin, Michael: "Synthesizing Natural Textures" University of Utah. 10 Pages.

Barnes, et al: "The Generalized PatchMatch Correspondence Algorithm" European Conference on Computer Vision, Sep. 2010, 14 Pages.

Barnes, et al: "PatchMatch: A Randomized Correspondence Algorithm for Structural Image Editing" ACM Transaction on Graphics (Proc. SIGGRAPH), Aug. 2009. 10 Pages.

Efros, et al: "Image Quilting for Texture Synthesis and Transfer" Artificial Intelligence Laboratory, Massachusetts Institute of Technology, Cambridge, Massachusetts 02139. 6 Pages.

(Continued)

*Primary Examiner* — Carlos Perromat
*Assistant Examiner* — Nurun N Flora
(74) *Attorney, Agent, or Firm* — Farjami & Farjami LLP (57) ABSTRACT

There is provided a system and method for parallel coherent random walk search for image processing. There is provided a method comprising selecting a present candidate from coherent texels of a target texel in an output texture, assigning a position of the present candidate as a random search center position within an input exemplar, and repeating iterations of a random walk search while an area exceeds a cut-off. Each iteration comprises: retrieving a random candidate within the area centered on the random search center position, updating the present candidate and the random search center position to the random candidate if the random candidate is a closer match, and reducing the area. The initial present candidate selection may use parallel k-coherence with k=1. The parallel coherent random walk search is particularly applicable for texture by numbers (TBN), as the random walk allows for faster convergence of transition areas between textures.

20 Claims, 6 Drawing Sheets (56) References Cited

OTHER PUBLICATIONS

Efros, et al: "Texture Synthesis by Non-parametric Sampling" IEEE International Conference on Computer Vision, Corfu, Greece, Sep. 1999. 6 Pages.

Hertzmann, et al: "Image Analogies" Proceedings of the 28th annual conference on Computer graphics and interactive techniques, 2001. 14 Pages.

Kwatra, et al: "Texture Optimization for Example-based Synthesis" ACM Transactions on Graphics (TOG)—Proceedings of ACM SIGGRAPH 2005 vol. 24 Is. 3, Jul. 2005. 8 Pages.

Lefebvre, et al: "Parallel Controllable Texture Synthesis" ACM Transactions on Graphics (TOG)—Proceedings of ACM SIGGRAPH 2005 vol. 24 Is. 3, Jul. 2005. 10 Pages.

Muja, et al: "Fast Approximate Nearest Neighbors with Automatic Algorithm Configuration" International Joint Conference on Computer Vision, Imaging and Computer Graphics Theory and Application, 2009. 10 Pages.

Ramanarayanan, et al: "Constrained Texture Synthesis via Energy Minimization" IEEE Transaction on Visualization and Computer Graphics, Jan.-Feb. 2007. 13 Pages.

Tong, et al: "Synthesis of Bidirectional Texture Functions on Arbitrary Surfaces" ACM Transactions on Graphics (TOG)—Proceedings of ACM SIGGRAPH 2002 vol. 21 Issue 3, Jul. 2002. 8 Pages.

Wei, et al: "State of the Art in Example-based Texture Synthesis" Eurographics 2009, State of the Art Report, EG-STAR (2009) 25 Pages.

Wei, et al: "Fast Texture Synthesis using Tree-structured Vector Quantization" Proceedings of the 27th annual conference on Computer graphics and interactive techniques, 2000. 10 Pages.

\* cited by examiner

PARALLEL COHERENT RANDOM WALK SEARCH FOR IMAGE PROCESSING

BACKGROUND OF THE APPLICATION

Example based texture synthesis is one of the most versatile, powerful, and widely used techniques in image processing. An exemplar may be synthesized into a high quality texture of arbitrary size, which may then be utilized for image or video modification, noise reduction, three-dimensional texture mapping, and other image processing tasks. The synthesis may also be augmented by techniques such as texture by numbers (TBN), allowing users to specify various additional constraints and texture areas for high quality, visually consistent renderings with user defined art direction.

SUMMARY OF THE APPLICATION

There are provided systems and methods for parallel coherent random walk search for image processing, substantially as shown in and/or described in connection with at least one of the figures, as set forth more completely in the claims.

BRIEF DESCRIPTION OF THE DRAWINGS

The features and advantages of the present application will become more readily apparent to those ordinarily skilled in the art after reviewing the following detailed description and accompanying drawings, wherein.

DETAILED DESCRIPTION OF THE APPLICATION

The present application is directed to a system and method for parallel coherent random walk search for image processing. The following description contains specific information pertaining to the implementation of various aspects of the present application. One skilled in the art will recognize that various aspects of the present application may be implemented in a manner different from that specifically discussed in the present application. The drawings in the present application and their accompanying detailed description are directed to merely exemplary aspects of the present application.

At the core of any synthesis algorithm is a correspondence search method, by which a synthesis result for a pixel or texel is corrected or improved, for example by neighborhood matching the texel to the closest candidate in the exemplar. Pixel based scanline order coherence search is well known to encourage the growth of coherent image patches in the synthesized image. However, the restrictive search space of the coherence search also encourages the formation of disturbing texture seams, reducing synthesized image quality. Moreover, the sequential pixel processing order of coherence search necessitates long chains of casual dependencies, precluding parallel implementation. Parallel implementation is desirable to efficiently utilize modern multi-core processors and graphics processing units, enabling real-time interactive applications such as image or video editing with immediate visual feedback.

To this end, Appearance Space Texture Synthesis (ASTS) provides for parallel processing and search space candidate variety by careful pre-processing of the exemplar and the use of parallel k-coherence search. More specifically, the parallel k-coherence search is performed concurrently on multiple synthesis pixels during the correction phase of a repeated upsample, jitter, and correction sequence applied to a Gaussian stack derived from the exemplar. Unfortunately, the use of k-coherence requires the pre-computation of similarity sets for every pixel in the exemplar, which may be computationally expensive for large sized and changing exemplars, such as with high resolution image editing using TBN. While tree-based acceleration is known to improve pre-computation speed, memory usage quickly becomes burdensome for large sized exemplars accommodating multiple textures and texture transitions, as often the case with TBN. Moreover, the restrictive search space of parallel k-coherence search fails to provide enough variation for TBN, resulting in strong artifacts, especially at transitions between textures.

Since ASTS provides for parallel processing and some level of search space candidate variety, the use of parallel k-coherence search presents several drawbacks, most significantly the large number of pre-computations required. This pre-computation becomes increasingly burdensome as the size of the input exemplar increases and if multiple textures and their transitions are supported, such as with texture by numbers (TBN). Accordingly, as discussed in the publication titled "Instant Texture Synthesis by Numbers" (Busto, et al., Proceedings of the Vision, Modeling, and Visualization 2010, 81-85; ISBN: 978-3-905673-79-1), which is hereby incorporated fully into the present application by reference, a new parallel coherent random walk search is proposed to improve the synthesis convergence of ASTS while significantly reducing required pre-processing, enabling the accommodation of TBN and other real-time image manipulation processes with large and complex exemplars.

Figure 1A:
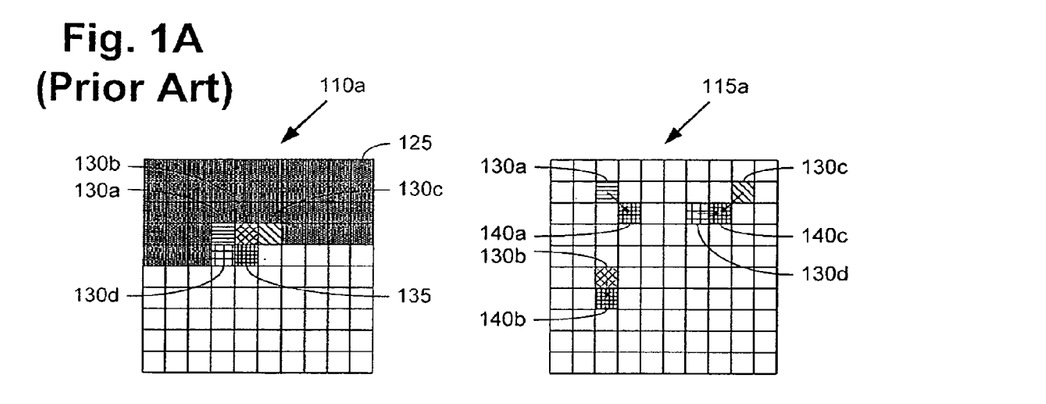
FIG. 1A presents texture synthesis using coherence search in scanline order.

Before discussion of the new search algorithm, it may be useful to briefly overview various known search methods for image synthesis. Thus, starting with FIG. 1A, FIG. 1A presents texture synthesis using coherence search in scanline order. FIG. 1A includes an output texture 110a and an input exemplar 115a. For simplicity, output texture 110a and input exemplar 115a are shown as low-resolution two-dimensional images comprised of pixel color intensities, and the output texture 110a is the same size as the input exemplar 115a.

Examining output texture 110a, it can be observed that several texels or pixels are already fully synthesized, as indicated by synthesized pixel 125. Prior to any synthesis, output texture 110a may be initialized, for example with random data using input exemplar 115a as a heuristic. In a conventional scanline order synthesis, output pixels are then generated in sequence from left to right and top to bottom. Additionally, the matched neighborhood in input exemplar 115a for each synthesized pixel 125 is stored and utilized for future synthesis of adjacent pixels. Thus, when considering candidates for target pixel 135, the adjacent pixels that are already synthesized or the coherent candidates in a neighborhood may be utilized for searching. In FIG. 1A, it can be seen that a 3×3 neighborhood is considered, including synthesized pixels 130a, 130b, 130c and 130d. The pixels to the right and below target pixel 135 are not considered, as they have not been synthesized yet.

Since the matched neighborhood positions of synthesized pixels 130a, 130b, 130c and 130d within input exemplar 115a are known, a simple offset shift retrieves the appropriate coherent candidates for consideration, as indicated by the arrows within input exemplar 115a. Thus, coherent candidates 140a, 140b, and 140c are readily found in input exemplar 115a within constant time. As shown in input exemplar 115a, multiple pixels may point to the same candidate, such as for candidate 140c. Candidates 130a-130c may then be searched for a neighborhood most closely matching a neighborhood of target pixel 135, thereby providing the synthesis value for target pixel 135.

While coherence search propagates good matches to encourage the growth of coherent image patches, the sequential process ordering, which relies on previously synthesized pixels, is not easily translated into a parallelized operation. Moreover, if TBN is utilized rather than unbounded synthesis, disturbing seams and artifacts are made apparent at texture transitions. Accordingly, coherence search may be too simplistic to provide sufficient image quality at reasonable processing cost.

Figure 1B:
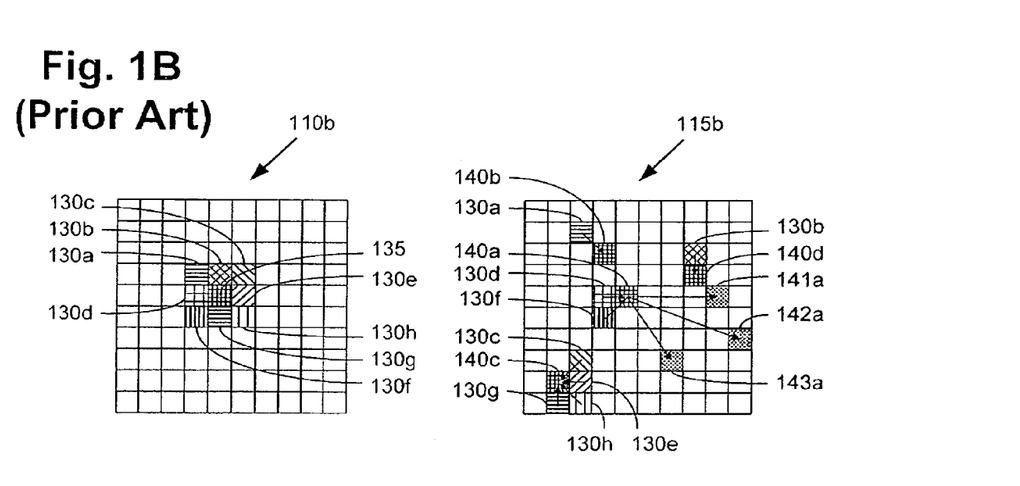
FIG. 1B presents texture synthesis using parallel k-coherence search.

Moving to FIG. 1B, FIG. 1B presents texture synthesis using parallel k-coherence search. As known in the art, k-coherence broadens the search space by pre-calculating similarity sets of k elements for each pixel in the input exemplar. Furthermore, since the similarity sets are pre-calculated in advance before any pixels are synthesized, multiple pixels may be synthesized in a parallel fashion, for example by using a repeated sequence of upsampling, jitter and correction applied to a Gaussian stack derived from the input exemplar. To improve synthesis quality and speed, the input exemplar itself may also be transformed into a more information dense space such as the Appearance Space, embedding coordinates and other information rather than just color information.

Using a 3×3 sized adjacent pixel neighborhood, pixels 130a, 130b, 130c, 130d, 130e, 130f, 130g and 130h may be utilized for k-coherence search of target pixel 135 within output texture 110b. Accordingly, the pre-calculated similarity sets for pixels 130a-130h as well as target pixel 135 may be examined within input exemplar 115b. For example, for k=4, each pixel in input exemplar 115b will have the 4 closest neighborhoods already pre-calculated, leading to a total of 4×9 or 36 possible candidates when using a 3×3 sized adjacent pixel neighborhood. For simplicity, the full similarity set is only shown for candidate 140a, the set including candidate 140a, 141a, 142a, and 143a. Pixels 130a-130h include only a single candidate in their respective similarity sets, omitting 3×8 possible candidates. As previously discussed, since multiple pixels may point to the same candidate, only candidates 140a, 140b, 140c, and 140d are thus added to the search space. Each of the candidates 140a-140d, 141a, 142a, and 143a may then be searched for the nearest matching neighborhood, thereby providing the synthesis value for target texel 135.

Thus, unlike conventional scanline order coherence search, parallel k-coherence search may be advantageously implemented on parallel architectures such as multi-core processors and graphics processing unit (GPU) shaders. Unfortunately, the requirement to pre-calculate similarity sets for every exemplar pixel severely limits the size and complexity of the input exemplar, particularly for real-time applications utilizing TBN.

Figure 1C:
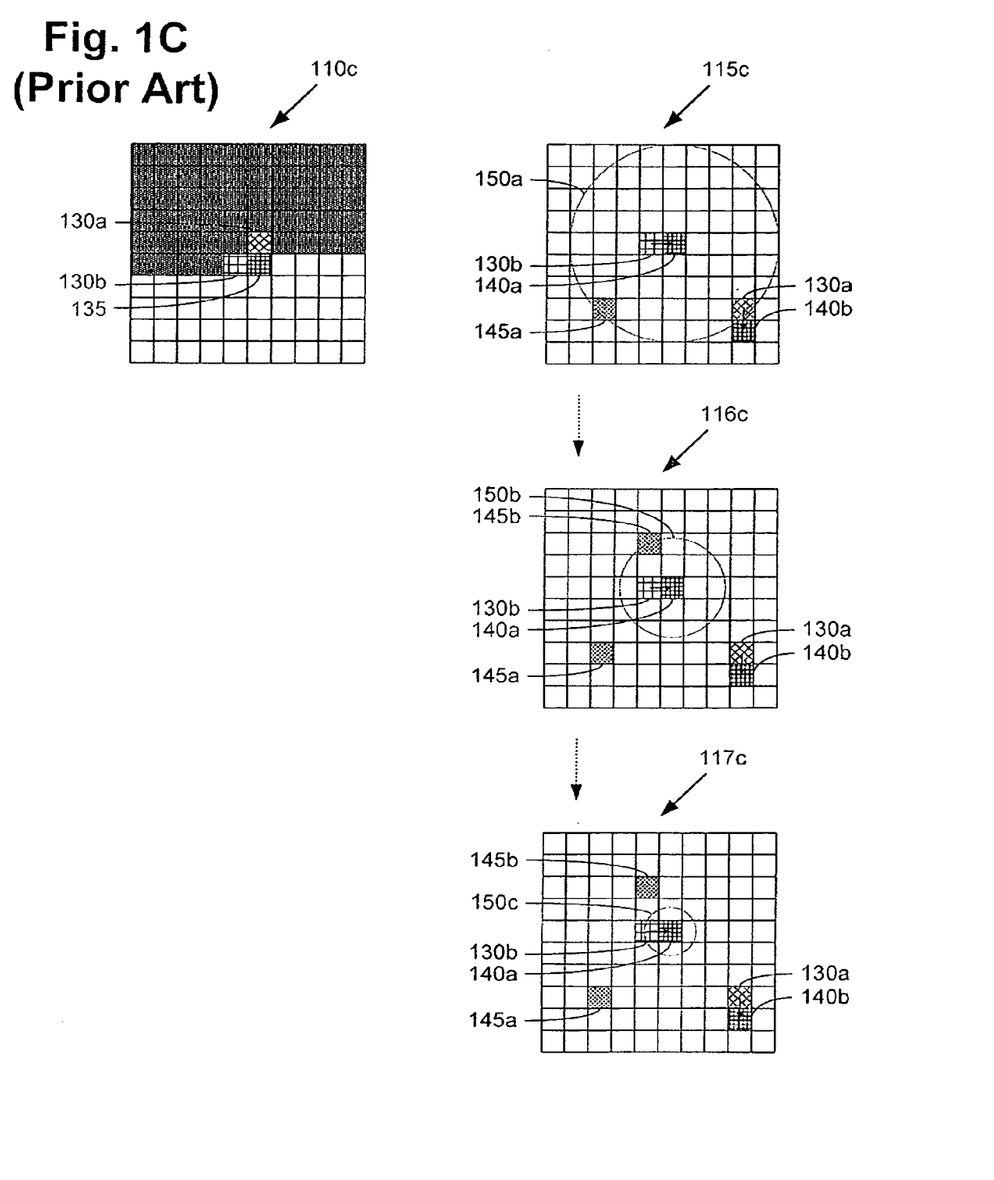
FIG. 1C presents texture synthesis using the PatchMatch search algorithm.

Next, FIG. 1C presents texture synthesis using the PatchMatch search algorithm. In contrast to parallel k-coherence, the PatchMatch search algorithm does not require lengthy pre-processing of similarity sets, since candidates are chosen using a constant time random selection algorithm. As shown in output texture 110c, PatchMatch proceeds in a conventional scanline order, as with coherence search. The adjacent left and upper pixels are selected for searching. Thus, for target pixel 135, synthesized pixels 130a and 130b are examined within input exemplar 115c.

Comparing candidates 140a and 140b, candidate 140a may provide the closest matching neighborhood. In this case, the position of candidate 140a is utilized as a random search center position. From this random search center position, an initial area for selecting random search candidates may be established. In FIG. 1C, area 150a corresponds to a circle centered on candidate 140a with a radius equal to approximately half of a resolution axis of input exemplar 115c. However, the circular shape of area 150a is shown as a conceptual simplification, and an actual implementation may utilize any convenient shape to accelerate calculation, for example a square shaped area centered on candidate 140a.

A random candidate, such as candidate 145a, is then retrieved within a range of the random search center position, as defined by area 150a in input exemplar 115c. The random candidate 145a is compared to the present candidate, candidate 140a. If random candidate 145a provides a closer neighborhood for target pixel 135, then random candidate 145a may replace candidate 140a as the present candidate. However, the random search center position remains the same. The constant position of the random search center position reflects the idea that good matches in the exemplar are more likely to be found nearby.

Successive iterations reduce the size of the search area, for example by an exponential factor. Thus, at the next step of the PatchMatch search from input exemplar 115c to input exemplar 116, a new random candidate 145b is selected within area 150b, which may represent a circle having a radius halved from area 150a. If a square shape is utilized for area 150a, then area 150b may correspond to a square having sides halved from area 150a. Similar to random candidate 145a, random candidate 145b is also compared to the present candidate for potential replacement. This process of reducing the search area and testing random candidates may continue until a size threshold cut-off is reached, for example when the search area radius is less than two pixels. Thus, area 150c of input exemplar 117c may represent the final random search pass. However, since the only remaining pixel within area 150c may be candidate 140a, which was already the initial candidate for testing, the random search may simply terminate, and the closest match from candidate 140a, 145a, and 145b is chosen to synthesize target pixel 135. Accordingly, by adjusting the initial search area size, the rate of area reduction, and the final area size cut-off, a fixed number of random search iterations may be implemented for each pixel to synthesize.

Given sufficient iterations, the PatchMatch algorithm may provide fairly good visual quality. Thus, the lengthy pre-processing required from parallel k-coherence search is avoided while still providing sufficient visual quality. Unfortunately, since the conventional PatchMatch algorithm utilizes a sequential ordering, it is not amenable to parallel processing. Thus, it would be desirable to provide a synthesis method that may execute in parallel while avoiding lengthy pre-processing.

Figure 2:
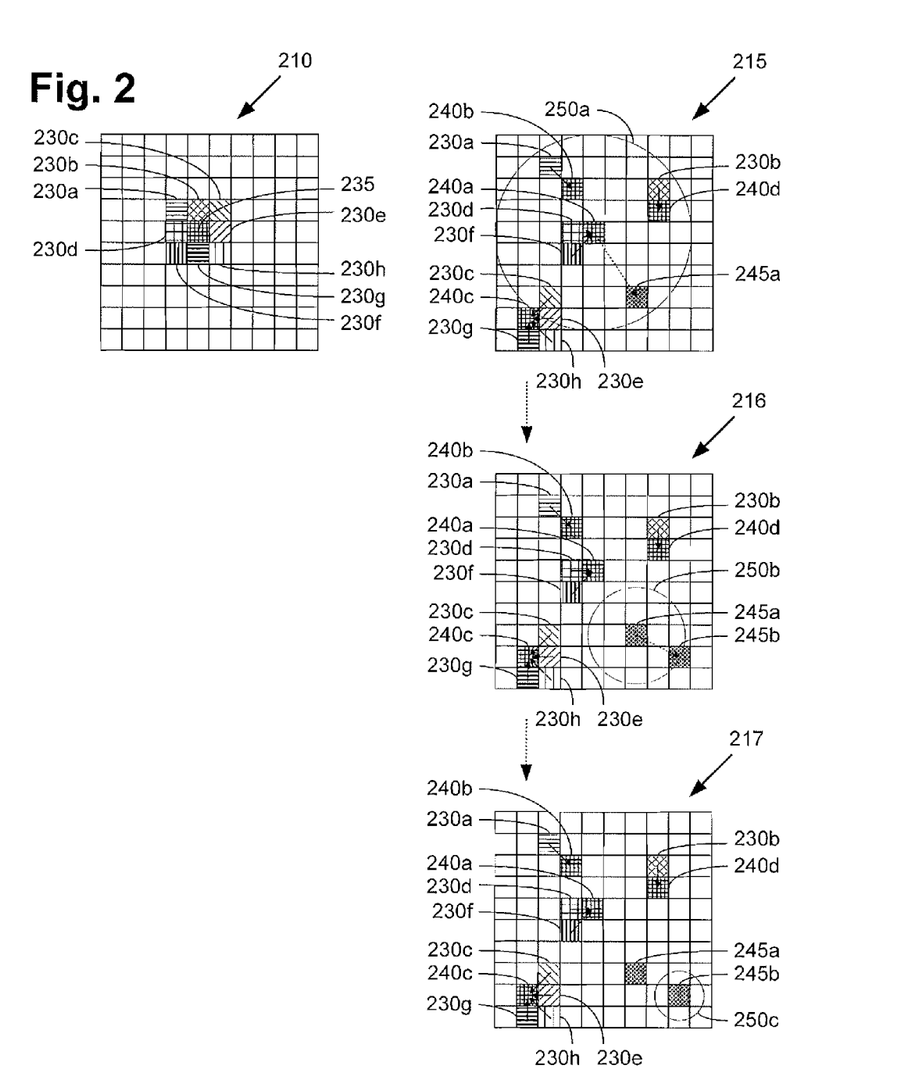
FIG. 2 presents an example texture synthesis using parallel coherent random walk search.

Accordingly, FIG. 2 presents an example texture synthesis using parallel coherent random walk search. Parallel k-coherence search is utilized with k=1, minimizing pre-processing by bypassing the calculation of similarity sets while accommodating the use of the ASTS framework for efficient parallel processing. After the optimal coherent candidate is found, a modified PatchMatch search is carried out to improve the search result. More specifically, rather than keeping the random search center position constant as with conventional PatchMatch search, a new proposed random walk search modifies the random search center position based on the present best candidate. While conventional PatchMatch search may also be utilized with parallel k-coherence search, additional correction passes may be required due to slower convergence to optimal matches, particularly for TBN. Contrary to expected results, the proposed parallel coherent random walk search provided superior visual results compared to parallel k-coherence search with large k requiring significant pre-processing.

As with FIGS. 1A, 1B, and 1C, FIG. 2 is shown as a simplified example with low-resolution two-dimensional images. However, as known in the art, output texture 210 may also be applied to three-dimensional objects and surfaces and may also be much larger in size than input exemplar 215. Furthermore, input exemplar 215 may comprise other data besides simple pixel color data, such as coordinates or a multi-dimensional principal components analysis (PCA) projection of neighborhoods from an input image, as with the ASTS framework. For example, the PCA projection may be at least 8 dimensions using at least 5×5 neighborhoods in the input image to provide an information dense appearance space. Additionally, to minimize pre-processing time, the PCA projection may calculate principal components using a pseudo-random subset of the input image neighborhoods when the input image exceeds a size threshold, for example 128 by 128 pixels. In this manner, even large input exemplars and TBN with multiple input textures may be supported without incurring a significant pre-processing penalty.

Starting with output texture 210, the 3×3 neighborhood of coherent pixels around target pixel 235 are considered for search, including pixels 230a, 230b, 230c, 230d, 230e, 230f, 230g and 230h. Thus, output texture 210 may correspond to output texture 110b from FIG. 1B. However, since k=1 in parallel coherent random walk search, the input exemplar 215 only includes one matching candidate for each pixel 230a-230h. Thus, candidate 240a, 240b, 240c, and 240d are provided for search. Assuming that candidate 240a is the closest matching candidate, the random search may begin around the position of candidate 240a as the random search center position. Random candidate 245a may thus be retrieved from an initially defined area 250a around candidate 240a. As previously discussed, circular areas are shown for conceptual simplicity, but squares or other shapes may be utilized during actual implementation. Assuming that random candidate 245a is a better match than candidate 240a, the random walk search may reposition itself such that the new random search center position is defined by a position of random candidate 245a. On the other hand, if random candidate 245a remains the better match, then the search may continue at the same random search center position.

Moving from input exemplar 215 to 216, assuming random candidate 245a is chosen as the new present candidate, the next step of the random walk search begins by retrieving a new random candidate 245b within area 250b around random candidate 245a. Area 250b is also reduced in size from area 250a, for example by halving a radius for a circular area, or halving a side for a square area. If random candidate 245b is a closer match than the present candidate, or random candidate 245a, then the random walk search may move the random search center position to the position of random candidate 245b, as shown moving from input exemplar 216 to 217. Area 250c is also reduced in size from area 250b. Since a size of area 250c may fall under a specified cut-off size, the random walk search may stop here and random candidate 245b may be returned as the best candidate for target pixel 235.

Figure 3A:
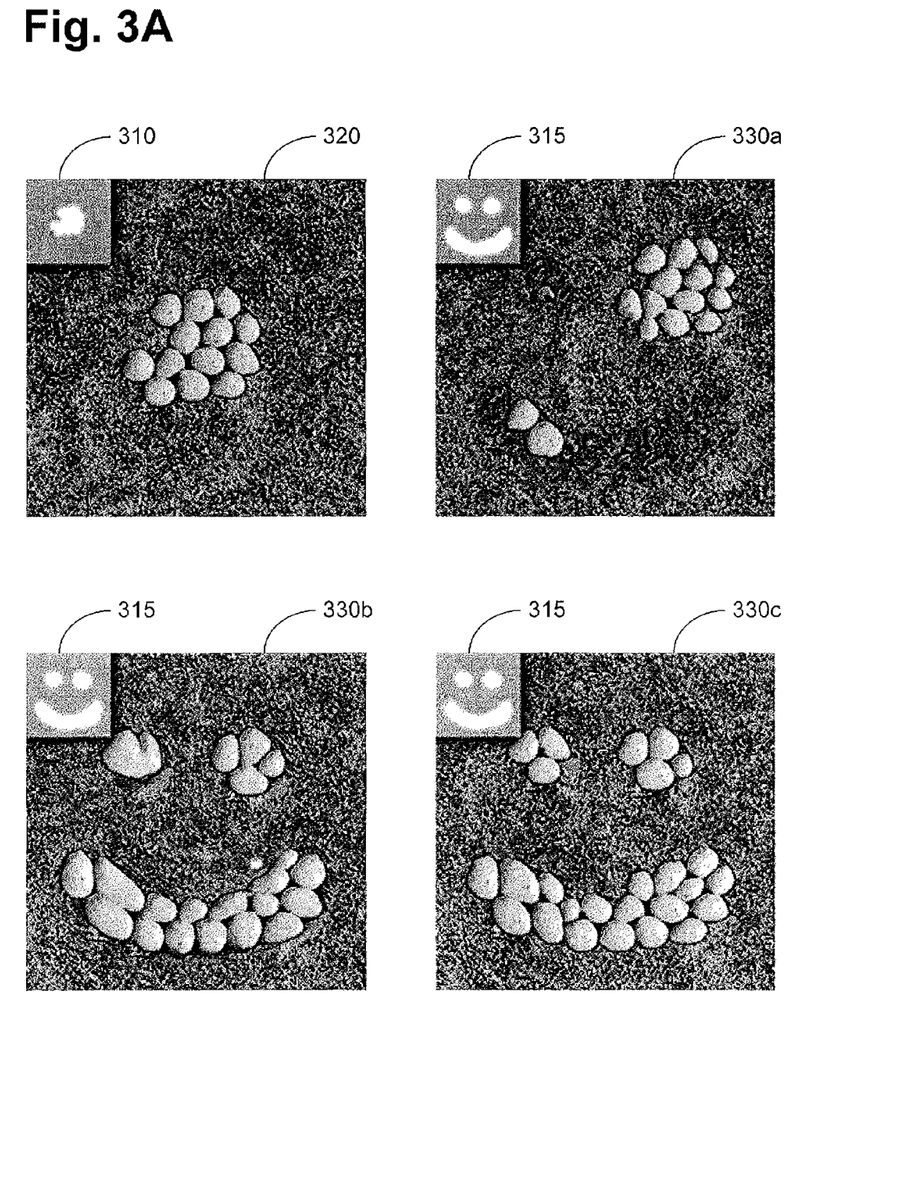
FIG. 3A presents exemplary synthesis results from texture by numbers (TBN) to compare parallel k-coherence search, parallel k-coherence with PatchMatch search, and parallel coherent random walk search.

To better appreciate the advantages of the parallel coherent random walk search, it may be helpful to observe actual TBN synthesis results using various search methods. Thus, FIG. 3A presents exemplary synthesis results from texture by numbers (TBN) to compare parallel k-coherence search, parallel k-coherence with PatchMatch search, and parallel coherent random walk search. An input exemplar 320 is provided with a source label map 310 for identifying the two types of input textures, grass and rocks. Given these inputs, it is desired to be able to synthesize a texture using an arbitrary target label map defined according to user artistic control, for example target label map 315 directing synthesis towards a smiling face composed of rocks and surrounded by grass.

Conventional k-coherence search results in output texture 330a. The weakness of k-coherence search is demonstrated here, as k-coherence is only able to suggest candidates that are compatible with adjacent synthesis pixels. Thus, in texture transition areas, poor coherent suggestions will simply be propagated. By introducing two iterations of PatchMatch random search, synthesis is greatly improved in output texture 330b; however, texture seams and other artifacts are still visible. Finally, by utilizing parallel coherent random walk search with two iterations, an output texture 330c is provided that is already converging to an ideal result. Since the random search is given the chance to move its search center or "walk", convergence towards optimal matches is accelerated.

Accordingly, contrary to the motivation of PatchMatch which is generally based on a primary premise that spatially closer guesses are more likely to be convergent, the introduction of a "random walk" allows the parallel coherent random walk search to converge towards better matches in less iterations, as a larger area of the input exemplar may be explored for best matches. This is of particular importance for TBN, as suitable transition pixels between texture transitions may be discovered more easily through a walking search compared to keeping the random search center position constant. More specifically, the "random walk" is able to traverse between different label areas for TBN, allowing for faster convergence.

Figure 3B:
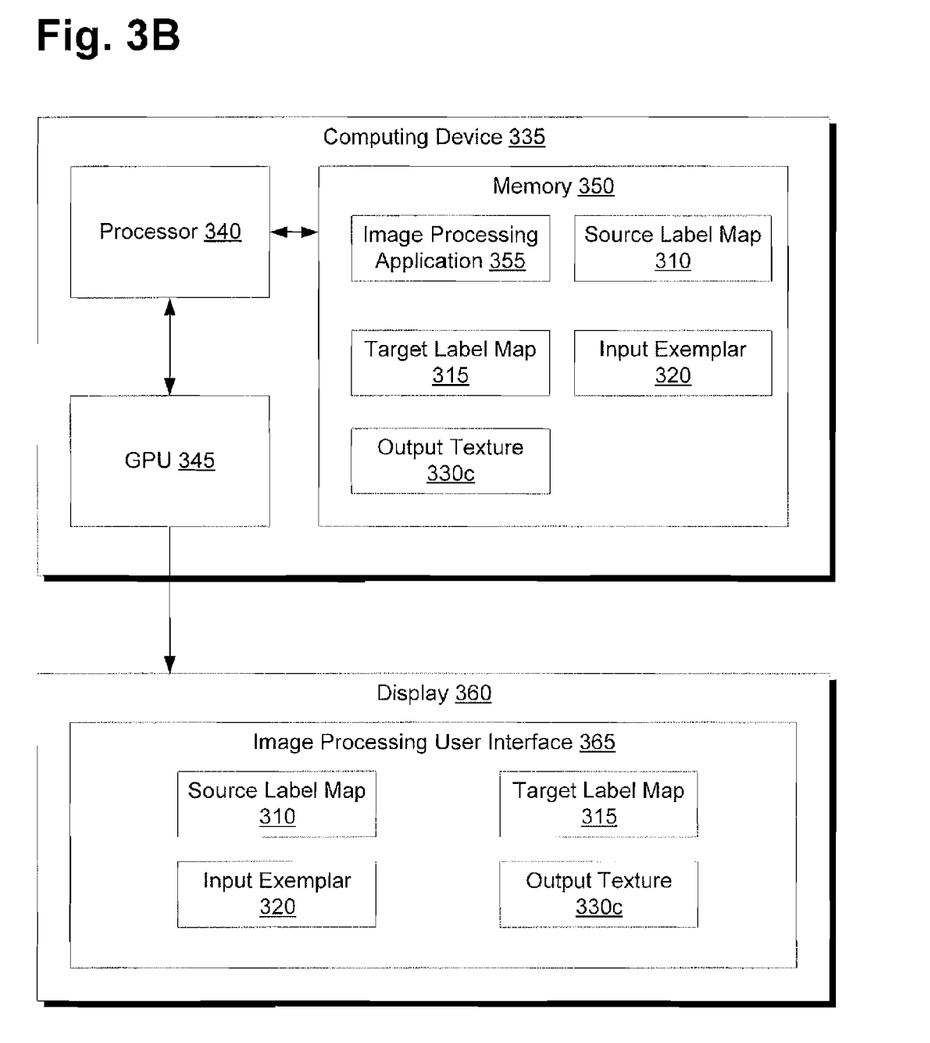
FIG. 3B presents an example system by which a parallel coherent random walk search may be provided.

FIG. 3B presents an example system by which a parallel coherent random walk search may be provided. Computing device 335 may comprise, for example, a desktop computer, a laptop computer, a workstation or a server. Processor 340, which may comprise a multi-core processor, may execute image processing application 355. Processor 340 may then utilize GPU 345 to present image processing user interface 365 to a user. The user may provide, view, and edit input exemplar 320 and source label map 310, corresponding to the same elements from FIG. 3A. Under user guidance, a target label map 315 may then be generated, and the user may request that output texture 330c be synthesized. Accordingly, image processing application 355 may perform a parallel coherent random walk search with TBN using input exemplar 320, source label map 310, and target label map 315 to generate output texture 330c, which may then be shown on display 360. The parallel coherent random walk search may be designed to run as a parallel process on multiple cores of processor 340 and/or multiple compute units of GPU 345.

Figure 4:
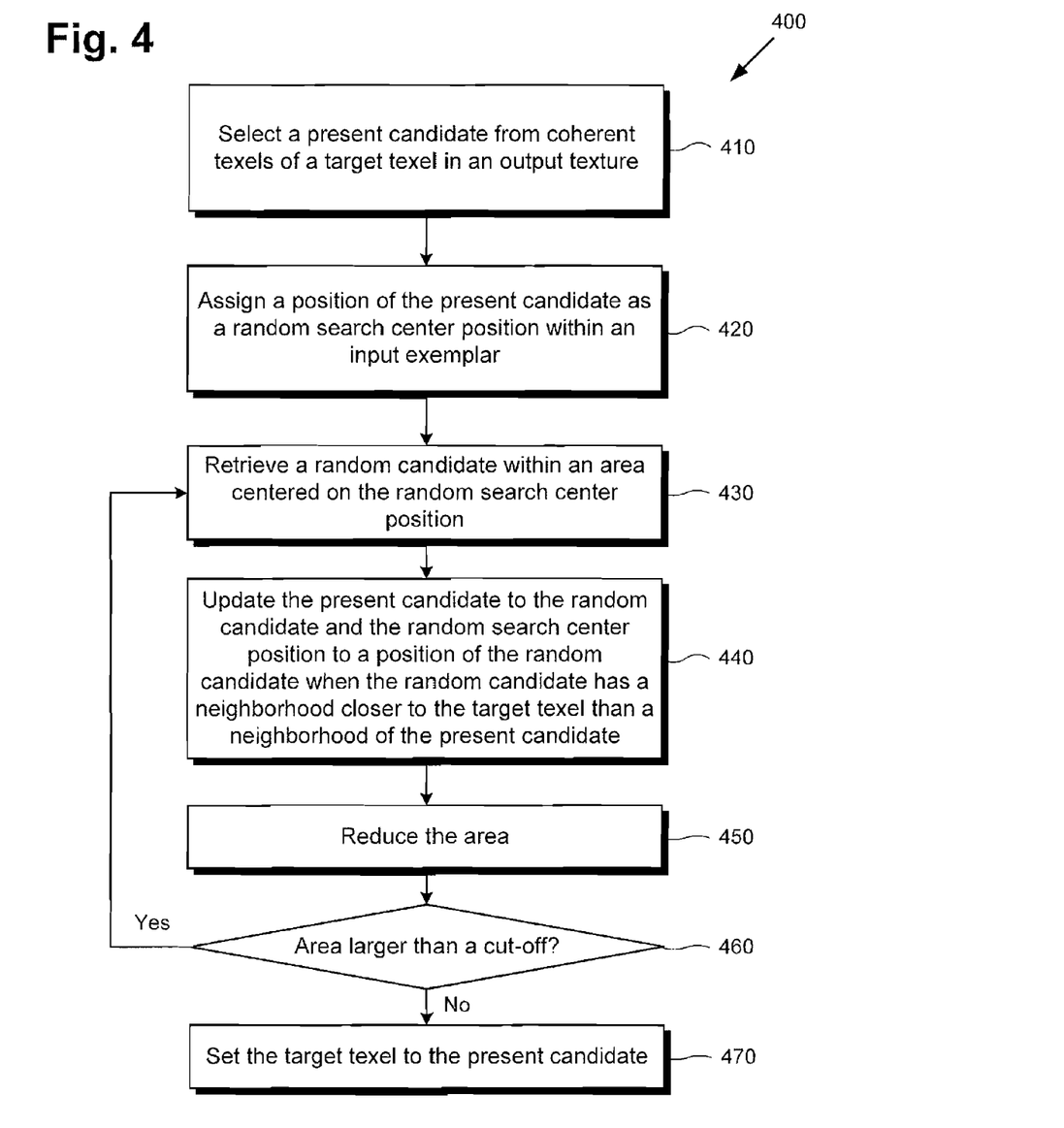
FIG. 4 shows an example flowchart describing the steps by which a device may implement a parallel coherent random walk search for image processing.

Turning to FIG. 4, FIG. 4 shows an example flowchart describing the steps by which a computing device may implement a parallel coherent random walk search for image processing. Certain details and features have been left out of flowchart 400 that are apparent to a person of ordinary skill in the art. For example, a step may comprise one or more substeps or may involve specialized equipment or materials, as known in the art. While steps 410 through 470 indicated in flowchart 400 are sufficient to describe some aspects of the present application, other implementations may utilize steps different from those shown in flowchart 400.

Referring to step 410 of flowchart 400 in FIG. 4 and output texture 210 of FIG. 2, step 410 of flowchart 400 comprises selecting a present candidate from coherent texels of a target texel, or target pixel 235, in output texture 210. As previously discussed, all steps of flowchart 400 may be carried out in a parallel fashion, for example through image processing application 355 executing on multi-core processor 340 or GPU 345 of FIG. 3B, since the matching neighborhood locations of the coherent texels, or pixels 230a, 230b, 230c, 230d, 230e, 230f, 230g and 230h may be pre-calculated in input exemplar 215 using parallel k-coherence search with k=1. As previously described, input exemplar 215 may be transformed using PCA projection of the ASTS framework. Accordingly, the synthesis of target pixel 235 may be independent of the synthesis state of the other pixels in output texture 210. Thus, the steps of flowchart 400 may be applied in parallel for every pixel in output texture 210 as target pixel 235. As known in the art, rather than processing all pixels in one parallel step, the parallel processing may also be subdivided into sub-groups for improved synthesis quality, and a reduced size run-time neighborhood such as a 4 point neighborhood may be evaluated to accelerate processing speed.

Moving to input exemplar 215, the present candidate, or candidate 240a may be chosen from the available candidates 240a, 240b, 240c and 240d indicated by the coherent texels, or pixels 230a-230h. Thus, step 410 may select candidate 240a as the present candidate.

Referring to step 420 of flowchart 400 in FIG. 4 and input exemplar 215 of FIG. 2, step 420 of flowchart 400 comprises assigning a position of candidate 240a as a random search center position within input exemplar 215. Thus, the random search center position is set to the location of candidate 240a within input exemplar 215. Additionally, an initial search area size may be assigned such that a desired number of iterations are provided. Thus, area 250a is provided, defined by a circle with a radius equal to approximately half of a resolution axis of input exemplar 215. However, as previously discussed, the area may actually comprise a square shape in an actual implementation.

Referring to step 430 of flowchart 400 in FIG. 4 and input exemplar 215 of FIG. 2, step 430 of flowchart 400 comprises retrieving a random candidate 245a within area 250a centered on candidate 240a, the random search center position. The random candidate may, for example, be selected using a pseudo-random function bounded within area 250a. If a square shape is utilized for area 250a, then the bounding of random candidates within area 250a may be greatly simplified.

Referring to step 440 of flowchart 400 in FIG. 4 and input exemplar 215 of FIG. 2, step 440 of flowchart 400 comprises updating the present candidate, or candidate 240a, to random candidate 245a, and also updating the random search center position to a position of random candidate 245a when random candidate 245a has a neighborhood closer to target pixel 235 than a neighborhood of candidate 240a. In other words, similar to PatchMatch, a random candidate 245a is evaluated to potentially replace candidate 240a as the present best candidate. While the random search center position may be kept constant as with PatchMatch, convergence towards an optimal solution may be delayed, as shown in output texture 330b of FIG. 3A. Thus, according to some implementations, the random search center position may also updated to the position of random candidate 245a if the present candidate is updated, thereby implementing a random walk search, in contrast to the constant random search center position of PatchMatch.

Referring to step 450 of flowchart 400 in FIG. 4 and input exemplar 215 of FIG. 2, step 450 of flowchart 400 comprises reducing the area. As previously discussed, an exponential reduction factor may be utilized, such as successive halving of a circle radius or a square side. Thus, as shown in the transition between input exemplar 215 and 216, the radius is approximately halved between area 250a and area 250b, the next random search area.

Referring to step 460 of flowchart 400 in FIG. 4, step 460 of flowchart 400 comprises returning to step 430 if the area is larger than a cut-off, and continuing to step 470 otherwise. As previously discussed, the cut-off may be set to a small value, such as a circle with a radius of two pixels, a square with sides of two pixels, or to any other area size to effectively control the number of random search iterations. Since the area may not yet be under this cut-off, steps 430-450 may be repeated for random candidate 245b, as shown in input exemplar 216 of FIG. 2. Once the search area is reduced below the threshold indicated by the cut-off, as with area 250c of input exemplar 217, the iterations may end and processing may proceed to step 470, as shown in flowchart 400.

Referring to step 470 of flowchart 400 in FIG. 4 and output texture 210 of FIG. 2, step 470 of flowchart 400 comprises setting target texel 235 to the present candidate, which may be set to random candidate 245b after the iteration of steps 430-450. Accordingly, the synthesis of target texel 235 is completed. While unbounded synthesis is demonstrated as an example, TBN may also be implemented by utilizing a source label map and a target label map during the selection and updating steps of step 410 and step 440, as shown by the use of source label map 310 and target label map 315 for the synthesis of output texture 330c in FIGS. 3A and 3B.

After all pixels are synthesized and all iterations of parallel processing are completed, the finished output texture 210 may be shown on a display, for example as output texture 330c on display 360 of FIG. 3B, allowing the user to adjust source label map 310 and target label map 315 in reaction to observing the results of output texture 330c. Accordingly, the user may apply trial and error adjustment of art direction in real-time. Since the disclosed parallel coherent random walk search is generally applicable to improve the search result of any operation utilizing k-coherence, the present application is not limited to TBN synthesis and may also be applicable to a broad range of graphics and imaging algorithms.

From the above description of the present application it is manifest that various techniques can be used for implementing the concepts described above without departing from its scope. Moreover, while the present application has been described with specific reference to certain implementations, a person of ordinary skills in the art would recognize that changes can be made in form and detail without departing from the spirit and the scope of the concepts described above. As such, the described implementations are to be considered in all respects as illustrative and not restrictive. It should also be understood that the present application is not limited to the particular implementations described herein, but is capable of many rearrangements, modifications, and substitutions without departing from the scope of the concepts described above.

What is claimed is:

1. A method for image processing, the method comprising:
   selecting a present candidate from coherent texels of a target texel in an output texture;
   assigning a position of the present candidate as a random search center position within an input exemplar;
   repeating, while an area is greater than a cut-off:
      retrieving a random candidate within the area centered on the random search center position;
      updating the present candidate to the random candidate and the random search center position to a position of the random candidate when the random candidate has a neighborhood closer to the target texel than a neighborhood of the present candidate;
      reducing the area;
   setting the target texel to the present candidate.

2. The method of claim 1, wherein the selecting is independent of a synthesis state of the output texture.

3. The method of claim 1, wherein the selecting is by parallel k-coherence search with k=1.

4. The method of claim 1, wherein the method is applied in parallel for a plurality of texels in the output texture as the target texel.

5. The method of claim 1, wherein the selecting and the updating further utilize a source label map and a target label map for implementing texture by numbers (TBN).

6. The method of claim 1, wherein the input exemplar comprises a multi-dimensional appearance space derived from a principal components analysis (PCA) projection of neighborhoods from an input image.

7. The method of claim 6, wherein the PCA projection calculates principal components using a pseudo-random subset of the neighborhoods when the input image exceeds a size threshold.

8. The method of claim 1, wherein the coherent texels are from a 3×3 neighborhood of the target texel.

9. The method of claim 1, wherein the reducing the area is by an exponential factor.

10. A computing device for image processing, the computing device comprising:
    a memory storing coherent texels of a target texel in an output texture;
    a processor configured to:
       select a present candidate from the coherent texels of the target texel in the output texture;
       assign a position of the present candidate as a random search center position within an input exemplar;
       repeat, while an area is greater than a cut-off:
          retrieving a random candidate within the area centered on the random search center position;
          updating the present candidate to the random candidate and the random search center position to a position of the random candidate when the random candidate has a neighborhood closer to the target texel than a neighborhood of the present candidate;
          reducing the area;
       set the target texel to the present candidate.

11. The computing device of claim 10, wherein the processor is configured to select the present candidate independent of a synthesis state of the output texture.

12. The computing device of claim 10, wherein the processor is configured to select the present candidate by parallel k-coherence search with k=1.

13. The computing device of claim 10, wherein the processor is configured to process in parallel a plurality of texels in the output texture as the target texel.

14. The computing device of claim 10, wherein selecting and updating further utilize a source label map and a target label map for implementing texture by numbers (TBN).

15. The computing device of claim 10, wherein the input exemplar comprises a multi-dimensional appearance space derived from a principal components analysis (PCA) projection of neighborhoods from an input image.

16. The computing device of claim 15, wherein the PCA projection calculates principal components using a pseudo-random subset of the neighborhoods when the input image exceeds a size threshold.

17. The computing device of claim 10, wherein the coherent texels are from a 3×3 neighborhood of the target texel.

18. The computing device of claim 10, wherein the processor is configured to reduce the area by an exponential factor.

19. A method for image processing, the method comprising:
    selecting a present candidate from coherent texels of a target texel in an output texture, the selecting being independent of a synthesis state of the output texture;
    assigning a position of the present candidate as a random search center position within an input exemplar;
    repeating, while an area is greater than a cut-off:
       retrieving a random candidate within the area centered on the random search center position;
       updating the present candidate to the random candidate when the random candidate has a neighborhood closer to the target texel than a neighborhood of the present candidate;
       reducing the area;
    setting the target texel to the present candidate.

20. The method of claim 19, wherein the method is applied in parallel for a plurality of texels in the output texture as the target texel.

* * * * *